(12) United States Patent
Wang

(10) Patent No.: US 10,390,537 B2
(45) Date of Patent: Aug. 27, 2019

(54) STRUCTURE OF DOUGH PREPARATION MACHINE

(71) Applicant: ANKO FOOD MACHINE CO., LTD., New Taipei (TW)

(72) Inventor: Li-Hsien Wang, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 98 days.

(21) Appl. No.: 15/814,405

(22) Filed: Nov. 16, 2017

(65) Prior Publication Data

US 2019/0142018 A1    May 16, 2019

(51) Int. Cl.
   *A41C 1/14*     (2006.01)
   *A21C 1/14*     (2006.01)
   *A21C 11/20*    (2006.01)

(52) U.S. Cl.
   CPC ............ *A21C 1/1465* (2013.01); *A21C 1/144* (2013.01); *A21C 11/20* (2013.01)

(58) Field of Classification Search
   CPC ...................................... A21C 1/141
   USPC ................................ 366/77, 97–99
   See application file for complete search history.

(56) References Cited

U.S. PATENT DOCUMENTS

| | | | | |
|---|---|---|---|---|
| 71,723 A | * | 12/1867 | Emmore ................... | A21C 1/06 366/99 |
| 90,509 A | * | 5/1869 | Davidson ............... | B29C 48/397 366/77 |
| 913,133 A | * | 2/1909 | Hicks ....................... | B01F 7/042 366/97 |
| 1,214,585 A | * | 2/1917 | Podzeamski ............. | A21C 1/06 366/99 |

* cited by examiner

*Primary Examiner* — David L Sorkin
(74) *Attorney, Agent, or Firm* — Leong C. Lei

(57) ABSTRACT

A dough preparation machine includes a power unit, which drives, through rotational speed mechanism, a helical screw shaft that extends into a dough chamber so that the dough is compressed and pushed through rotation of the helical screw shaft to be discharged out of a jet nozzle mounted to the dough chamber. The dough chamber is provided, at a location above the helical screw shaft, with an auxiliary dough driver, which includes two movable blades that are opposite to each other and are selectively extendable outward and retractable inward. When one of the movable blades passes through a circular sidewall of dough chamber, it is pressed by the sidewall to get retracted inwardly and at the same time causing another one of the movable blades to extend outward to knead and poke dough. This process is cyclically repeated to efficiently knead the dough and prevent attachment of the dough.

10 Claims, 12 Drawing Sheets

STRUCTURE OF DOUGH PREPARATION MACHINE

(a) TECHNICAL FIELD OF THE INVENTION

The present invention relates generally to a dough preparation machine that includes a unique auxiliary dough driver mechanism, which helps, during a continuous driving and kneading operation of dough with the dough preparation machine, prevent ineffective rotation resulting from dough surrounding the driver mechanism, so as to make dough preparation more efficient and cleaning of the auxiliary dough driver easier.

(b) DESCRIPTION OF THE PRIOR ART

A dough preparation machine is one kind of commonly used food processing machinery and may also be a part of a large-scale dough-based food processing machine and has a general function of repeatedly, for multiple times, knead dough so as to make the dough more elastic for subsequent operation of dough-based foodstuffs. This machine is generally an elementary device for food processing. A conventional structure of the dough preparation machine is shown in FIGS. 11 and 12, in which a power unit and a rotational speed mechanism 70 (of which details are omitted in the drawings) collaboratively drive a helical screw shaft 80, which extends deeply into a dough chamber 71. A jet nozzle 72 is provided on a front of the dough chamber 71. A screw 81 is provided on each of two sides of the helical screw shaft 80 and is rotated in direction toward the center. Thus, dough 90, when supplied downward from a top side into the dough chamber 71 (indicated by a central phantom line shown in FIG. 12), is rotated by the helical screw shaft 80 to drive the dough 90 forward to the jet nozzle 72 for discharging therefrom. To prevent the dough 90 from attaching to the dough chamber 71 and thus not continuing movement thereof, the screws 81 on the two sides help expand the space in which rotation is conducted so as to help push the dough 90 from two sides toward the center of the dough chamber 71 to be further compressed by the rotation of the helical screw shaft 80 located on the under side, wherein the dough 90 is driven and compressed by three forces to be thereby sufficiently kneaded and smoothly discharged out of the dough chamber 71 for the next stage of dough processing.

However, since the dough 90 is a water-containing substance and is slightly sticky and since the two screws 81 that rotates to drive and poke the dough 90 are structured such that a helical blade (projecting blade) extending along a circumference of the screws 81 is used to push and poke the dough 90, after a long term operation, the spacing distance 82 between adjacent turns of the helical blade of the screw 81 will be completely filled with the dough 90 so that the screw 81, after a period of operation, becomes a rod-like rotary object that is filled with and surrounded and enclosed by the dough 90 and would lose the function of push and poke the dough 90. Consequently, the screw 81 is ineffective as being in idle rotation. The time period required for dough preparation is thus extended and the operation efficiency is extremely low. This is the primary deficiency of the prior art device.

Further, since the spacing distance 82 of the helical blade (projecting blade) of the screw 81 is filled with the dough 90, cleaning becomes a time- and labor-consuming job and also results in waste of dough. This is another deficiency of the prior art device.

SUMMARY OF THE INVENTION

The primary objective of the present invention is to provide a design in which the blade of the conventional screw of a dough preparation machine is modified as a movable blade, which extends out in an angular range of operation of driving and poking dough and retracts backward in another angular range of being not in operation of driving and poking the dough so as to be concealed in the angular range of no operation of poking dough to prevent the dough from attaching thereto and keep the moving blade to more effectively drive and poke dough.

Another objective of the present invention is to provide an arrangement wherein the moving blades are provided on two sides in a manner that when one extends out, the other one is retracted back for driving and poking dough, so that the moving blade would occupy no space and the best utilization of space can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
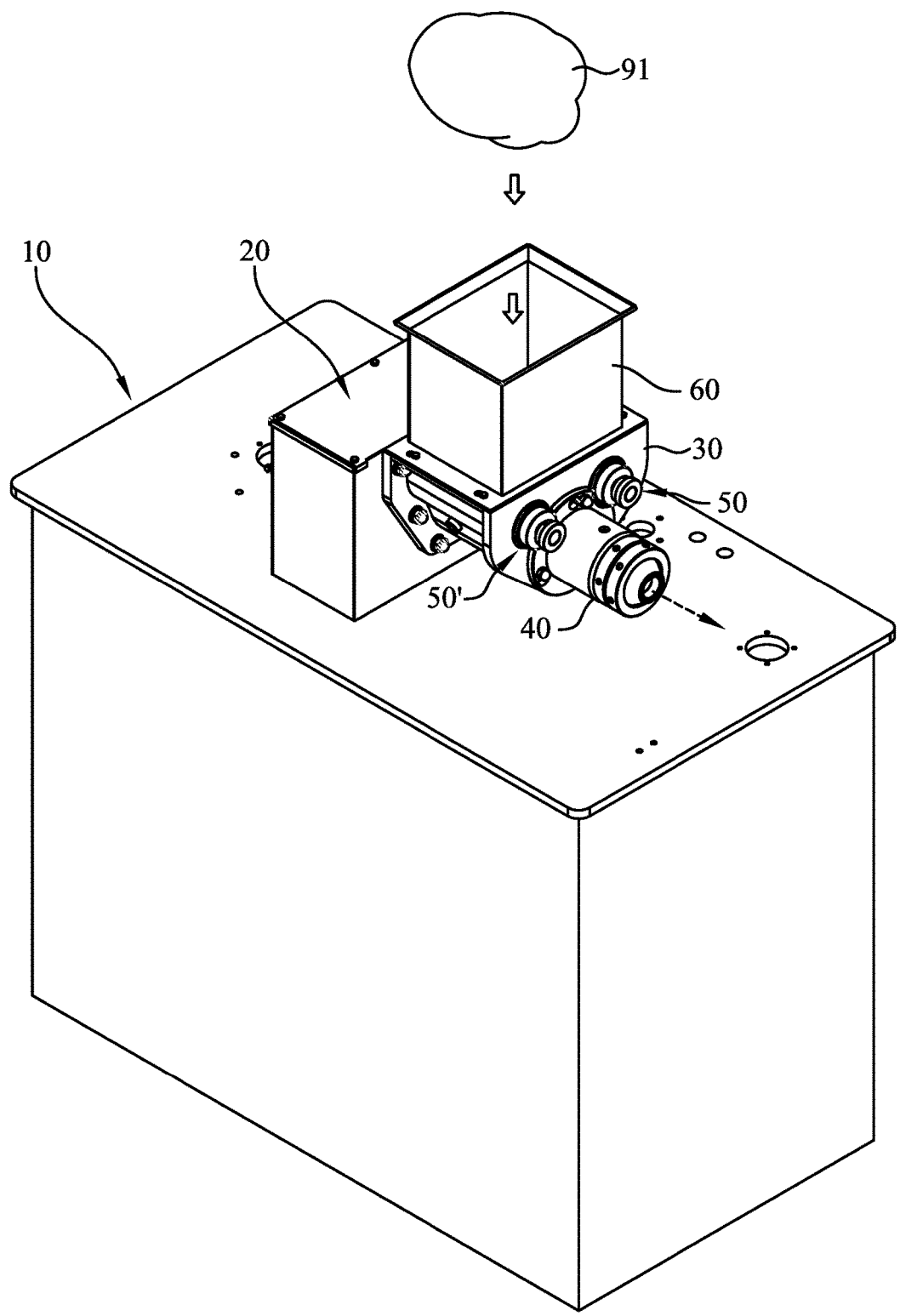
FIG. 1 is a perspective view showing a structure of the present invention.
Figure 2:
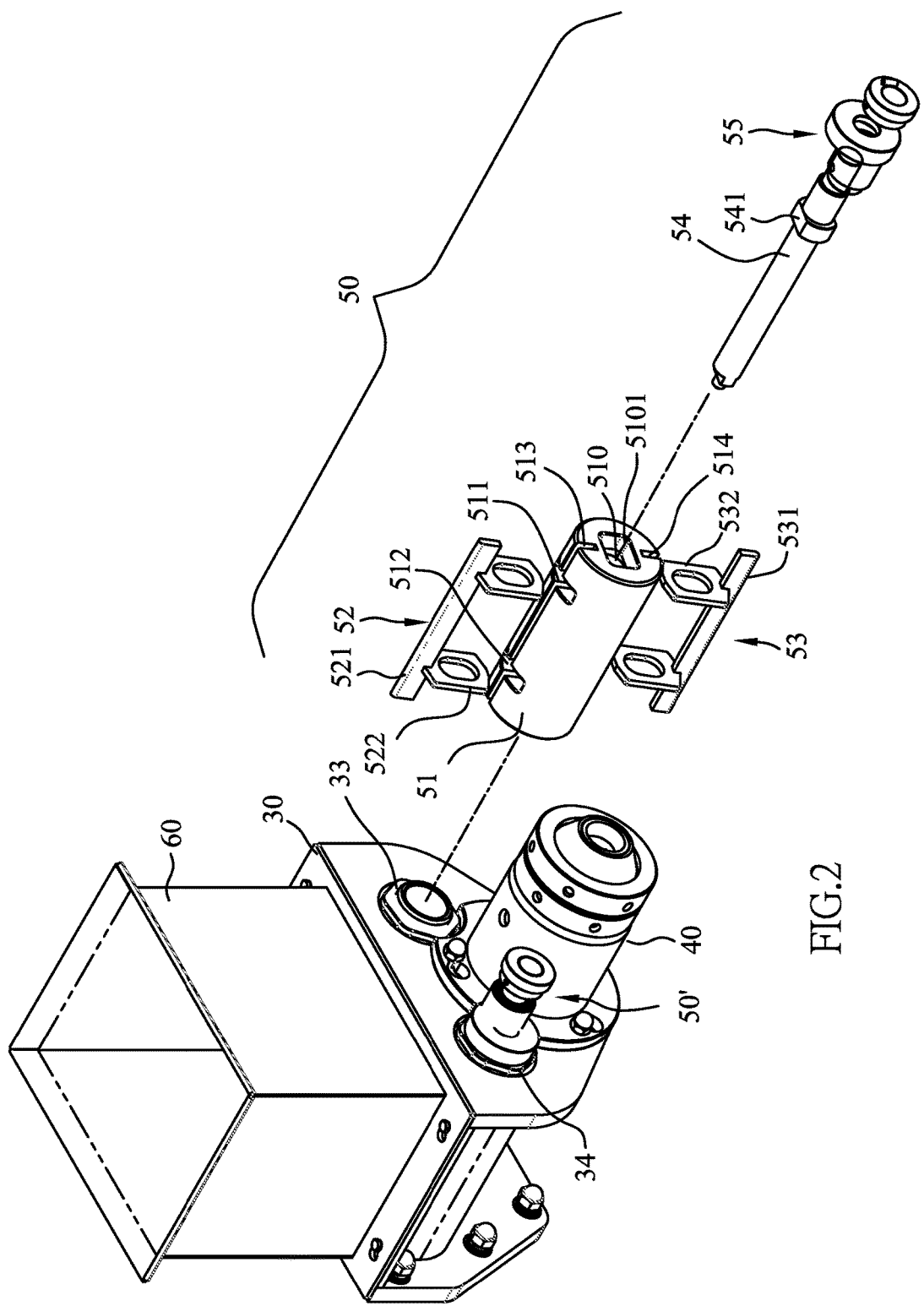
FIG. 2 is an exploded view of the structure of the present invention.
Figure 3:
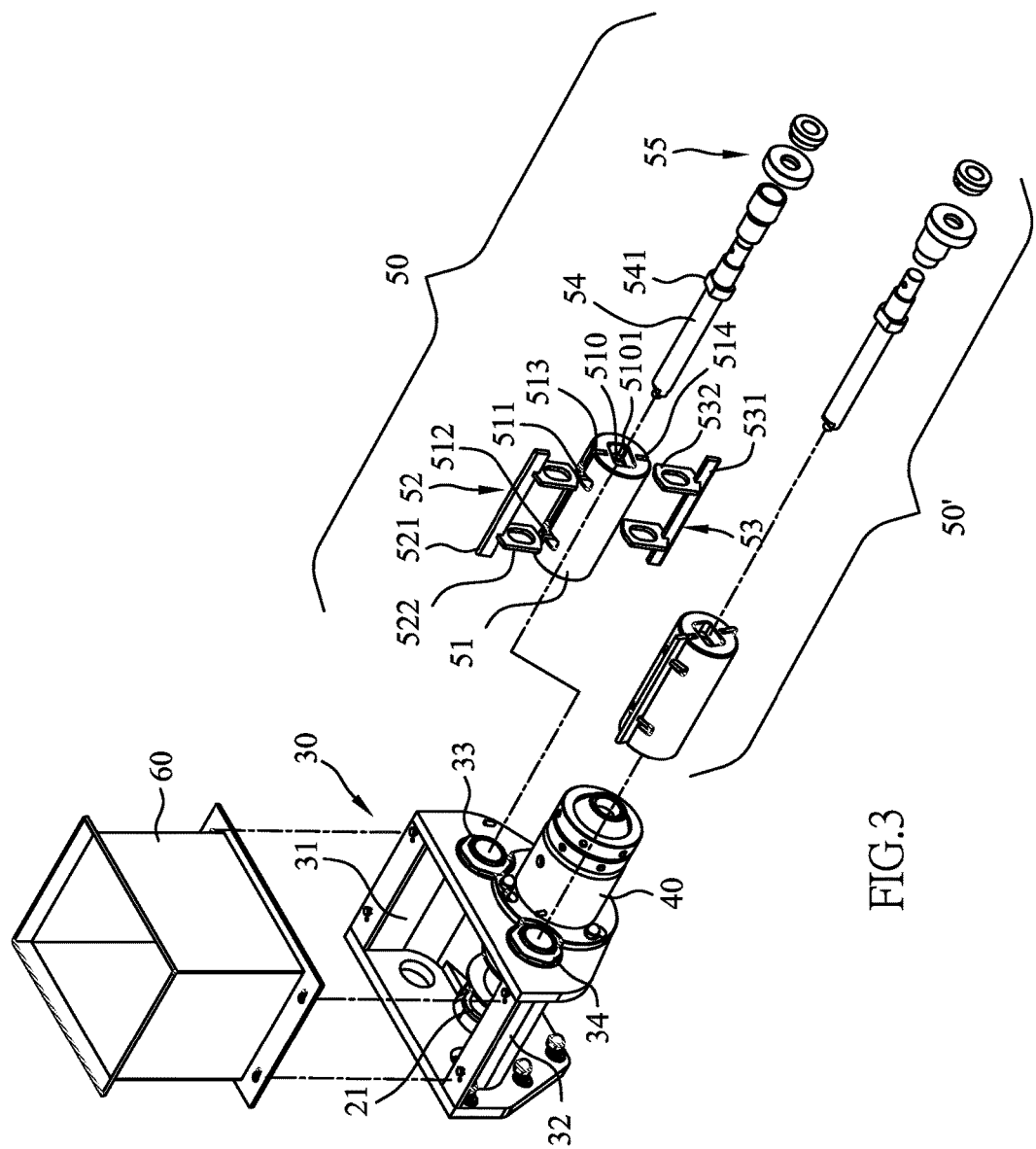
FIG. 3 is another exploded view of the structure of the present invention.
Figure 4:
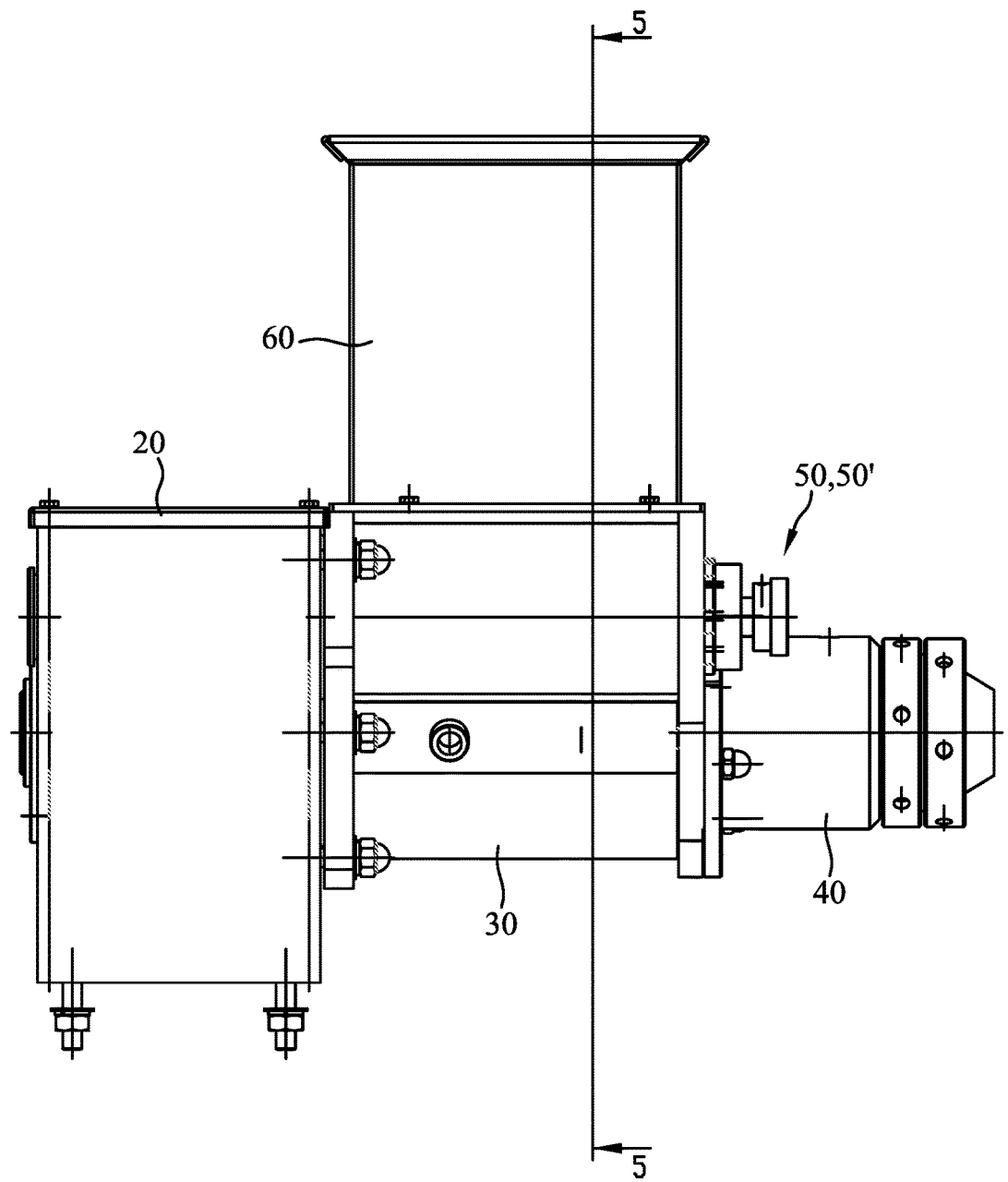
FIG. 4 is a side elevational view of the present invention.

The present invention provides a structure of a dough preparation machine, which, as shown in FIGS. 1, 3, and 4, comprises at least a power unit 10, which is operative in combination with a rotational speed mechanism 20 (of which details are not shown in the drawings) to drive a helical screw shaft 21. The helical screw shaft 21 is arranged to extend into a dough chamber 30. The dough chamber 30 is provided, on an end face thereof, with a jet nozzle 40, so that dough 91, after being disposed into the dough chamber 30, is subjected to rotationally compression and forward pushing by the helical screw shaft 21 to get fed out through the jet nozzle 40. To achieve a better effect of kneading, compression, and pushing of the dough 91, the dough chamber 30 is provided with two bearings 33, 34 located above the helical screw shaft 21 and each of the two bearings 33, 34 is provided with and coupled to an auxiliary dough driver 50, 50' for being simultaneously driven by the power unit 10 and the rotational speed mechanism 20.

As shown in FIGS. 2, 3, 6, 7, and 8, the two auxiliary dough drivers 50, 50' each comprise a rotary axle 51. The rotary axle 51 comprises a shaft hole 510 formed therein and penetrating therethrough in an axial direction. The shaft hole 510 is expanded and thus forms an enlarged fitting slot 5101 at an outer end. In a preferred embodiment, the fitting slot 5101 is a non-circular shape and may be a polygonal shape in an embodiment and is a rectangular shape in the instant embodiment shown. Further, the rotary axle 51 is provided on a circumferential wall thereof with two side openings 511, 512 penetrating therethrough in a radial direction. Further, two side slots 513, 514 are formed in the rotary axle 51 and extending in a longitudinal direction from two ends of the rotary axle and on two sides of two side openings 511, 512.

Figure 8:
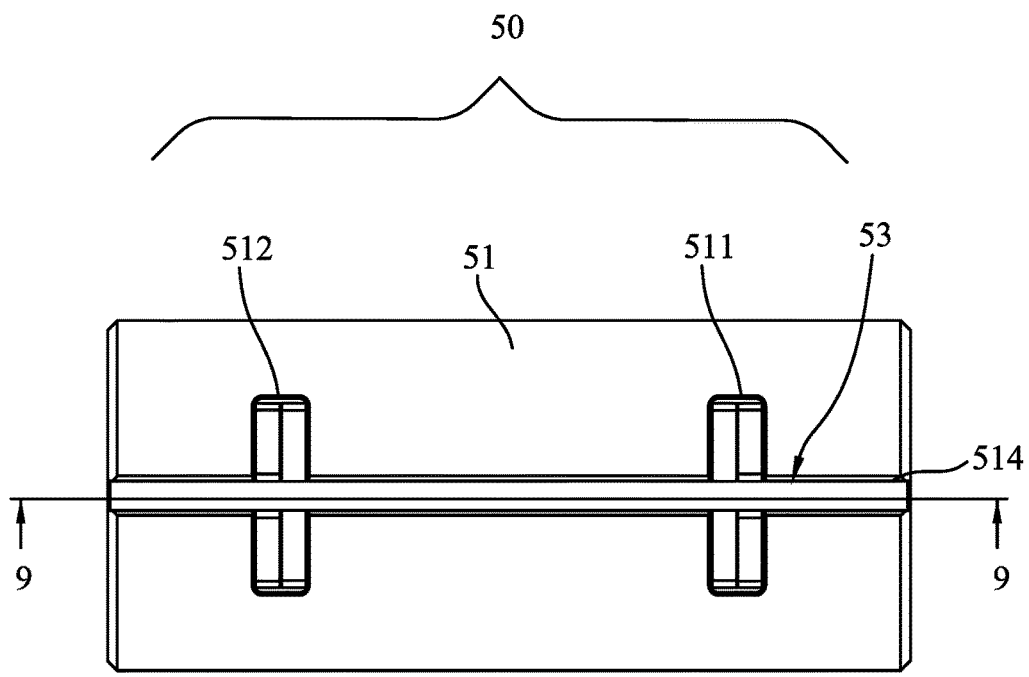
FIG. 8 is a side elevational view showing the rotary axle and the movable blades of the auxiliary dough driver according to the present invention in an assembled form.
Figure 9:
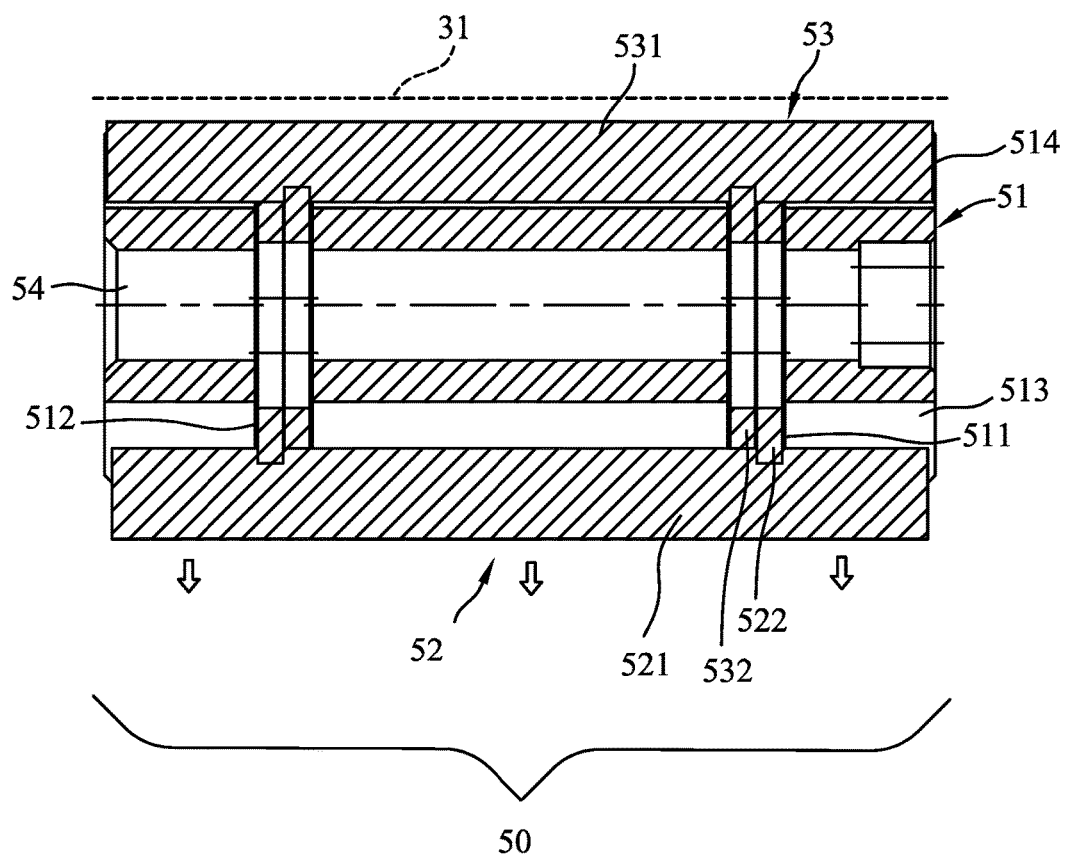
FIG. 9 is a cross-sectional view, taken in an axial direction, showing the rotary axle and the movable blades of the auxiliary dough driver according to the present invention, and also serving as a drawing for explanation.
Figure 10:
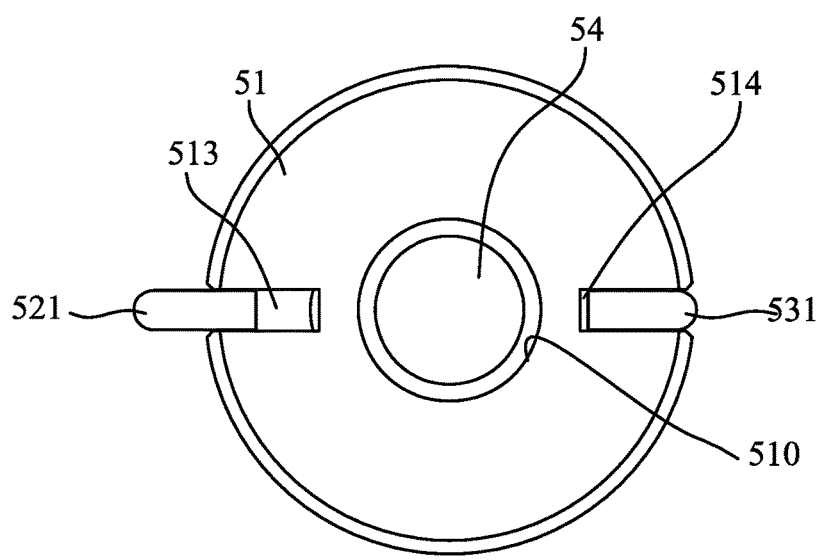
FIG. 10 is a cross-sectional view, taken in a radial direction, showing the rotary axle and the movable blades of the auxiliary dough driver according to the present invention at a different position.
Figure 11:
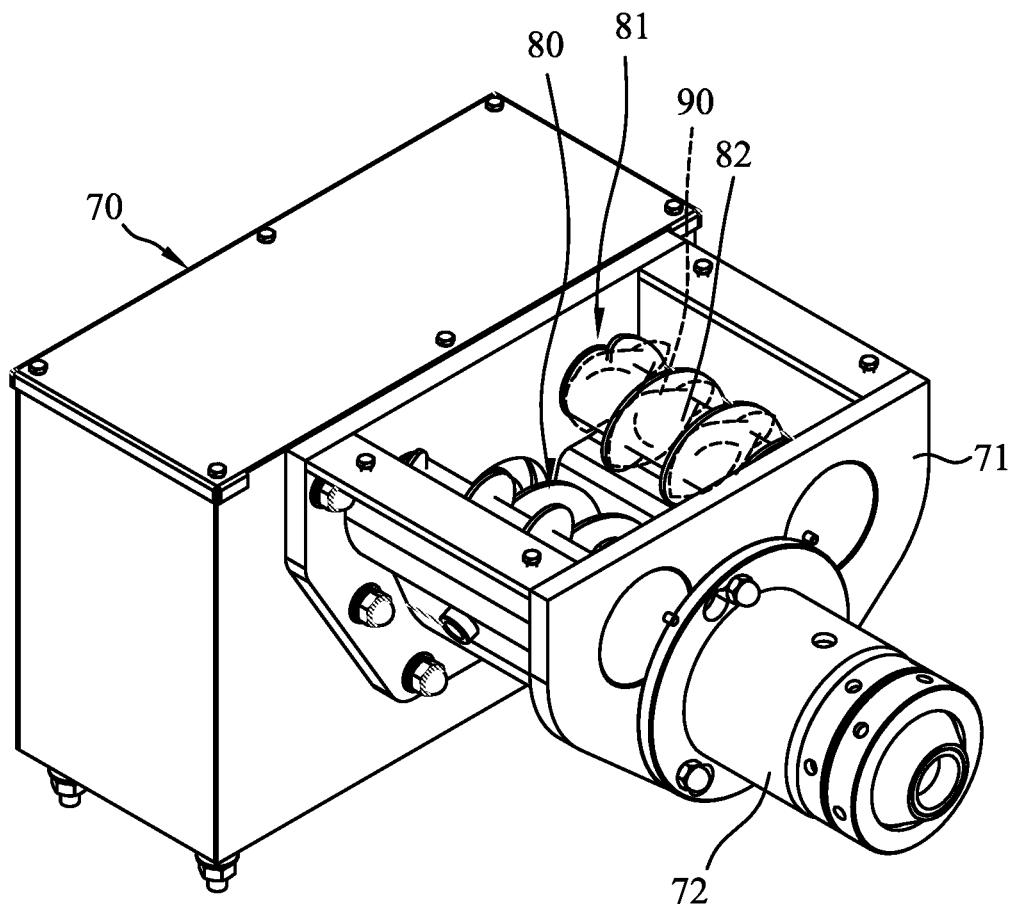
FIG. 11 is a schematic view illustrating a conventional dough preparation machine.
Figure 12:
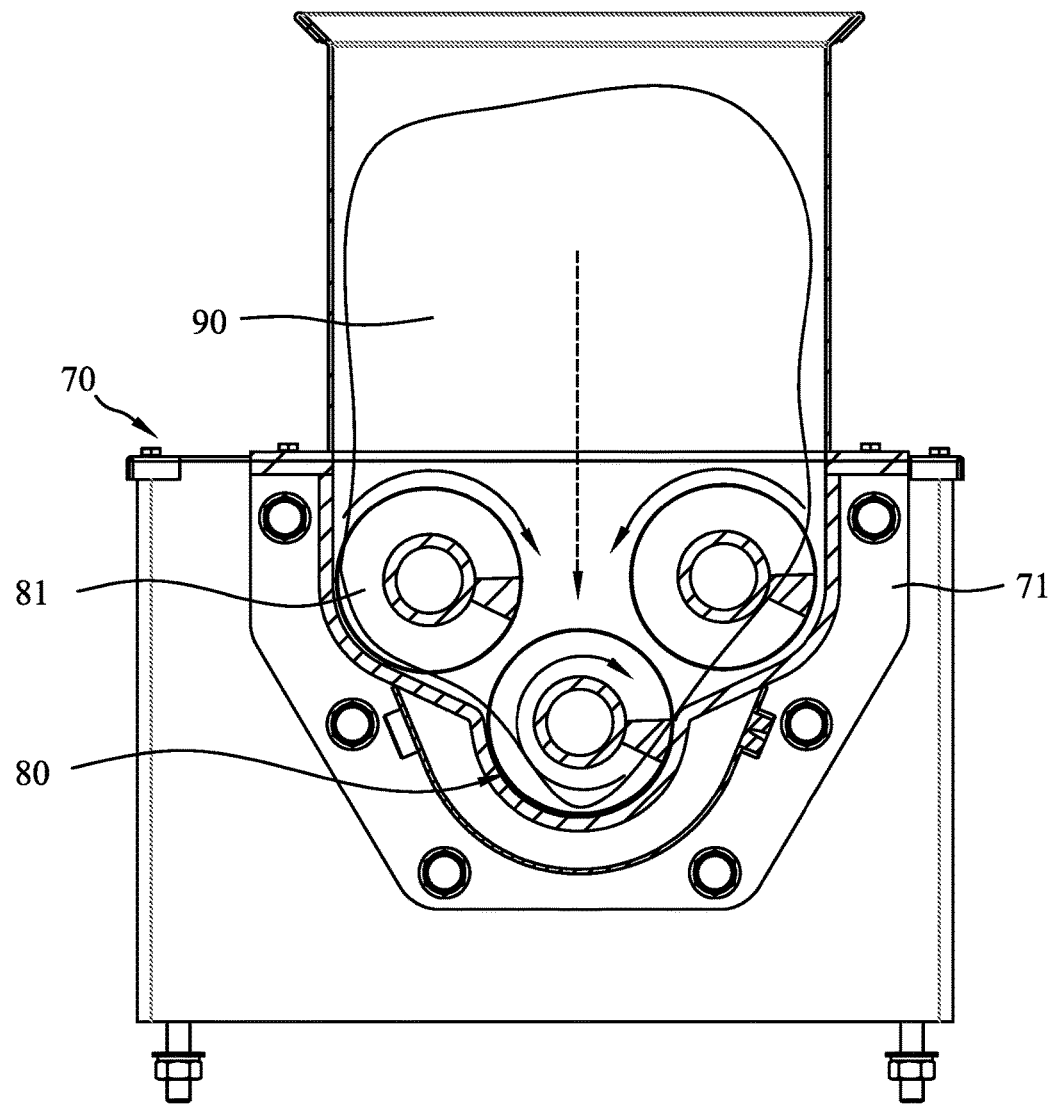
FIG. 12 is a cross-sectional view of the conventional dough preparation machine, illustrating an operation thereof.

As shown in FIGS. 2, 3, 6, and 10, two movable blades 52, 53 are each provided with, but not limited to, one driving plate 521, 531 and one retention ring 522, 532. In the embodiment of the present invention shown, the driving plates 521, 531 are each an elongated plate and are each provided with two retention rings 522, 532, and the two movable blades 52, 53 are respectively arranged on two opposite sides of the rotary axle 51 in such a way that the retention rings 522, 532 are inserted into the radially-extending side openings 511, 512 of the rotary axle 51. Referring to FIGS. 8 and 9, the two retention rings 522, 532 are disposed in the radially-extending side openings 511, 512 of the rotary axle 51 such that they are respectively located at a frontward position and a rearward position that are adjacent to and next to each other. The two driving plates 521, 531 are selectively receivable into the two side slots 513, 514 (details being provided below), when necessary.

As shown in FIGS. 3, 6, 9, and 10, the two auxiliary dough drivers 50, 50' are respectively set such that a central shaft 54 extends through the shaft hole 510 of each of the rotary axles 51 and also extends through the retention rings 522, 532 of the two movable blades 52, 53. For each of the auxiliary dough drivers 50, 50', the central shaft 54 is provided with a fitting section 541 corresponding to the fitting slot 5101 of the shaft hole 510 such that the fitting section 541 of the central shaft 54 is set in engagement with the fitting slot 5101 for causing rotation of the rotary axle 51 and a fastening assembly 55 is provided for fixing each of the auxiliary dough drivers 50, 50' to the corresponding one of the bearings 33, 34 on the dough chamber 30. Further, the retention rings 522, 532 of the two movable blades 52, 53 have internal openings that are of an elongate elliptic shape having a size larger than a diameter of the central shaft 54 to allow for extension of the central shaft 54 therethrough such that the two movable blades 52, 53 are allows for conducting radial sliding or displacement in a limited manner.

Figure 5:
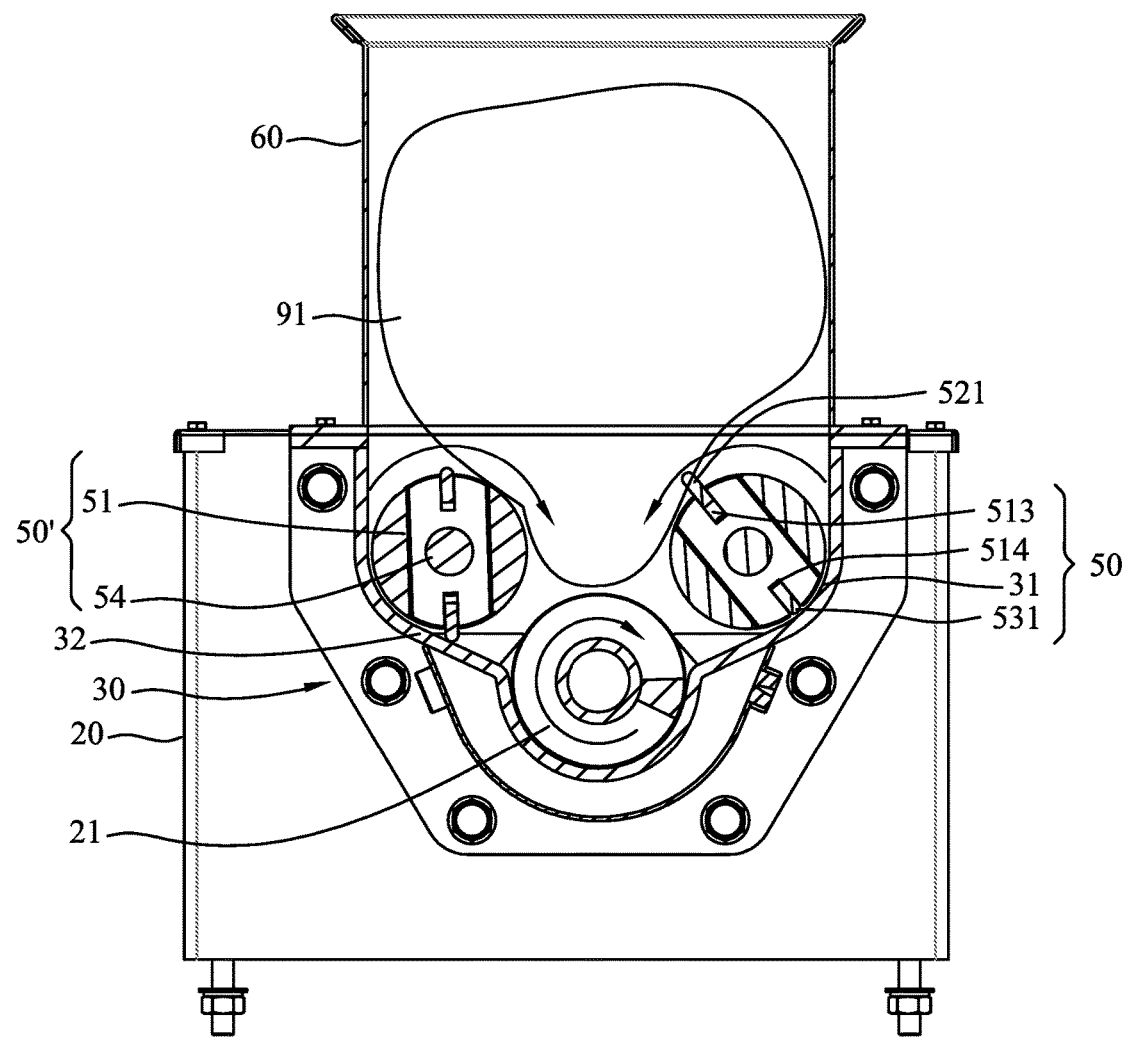
FIG. 5 is a cross-sectional view of FIG. 4 taken in a radial direction.
Figure 6:
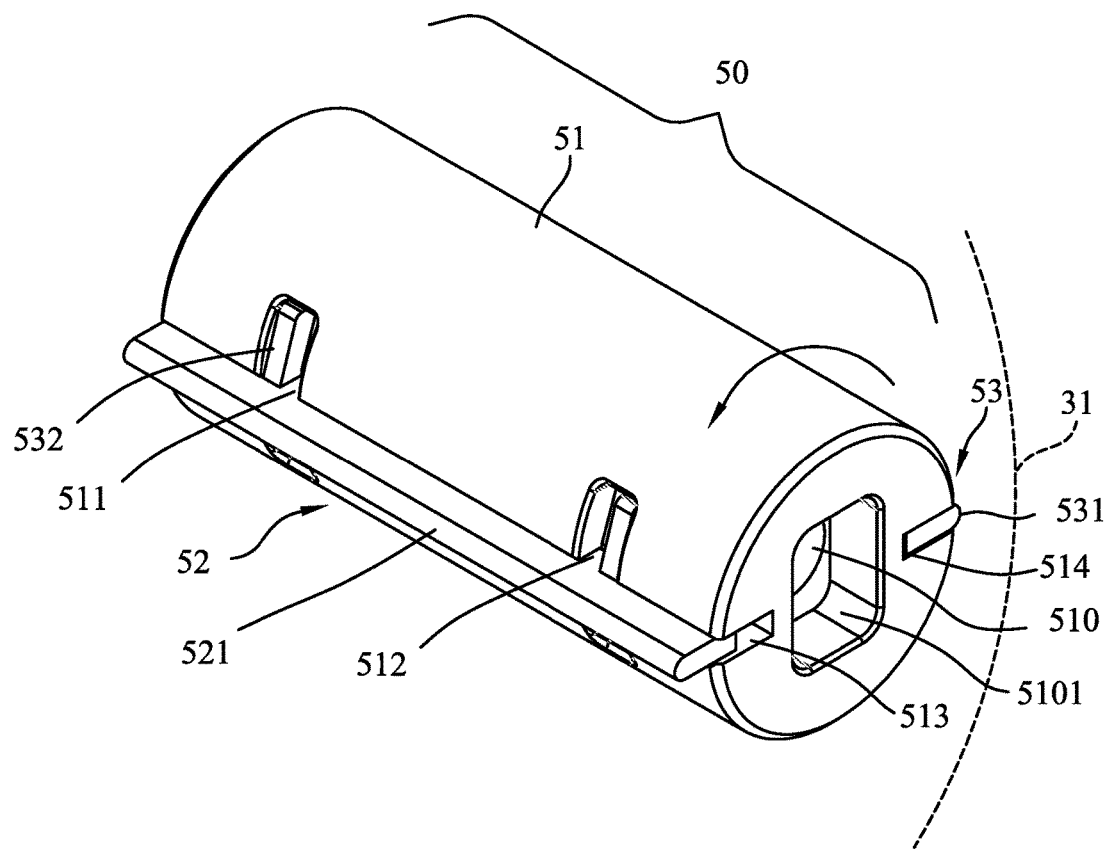
FIG. 6 is schematic view illustrating a rotary axle and movable blades of one auxiliary dough driver according to the present invention in an assembled form.
Figure 7:
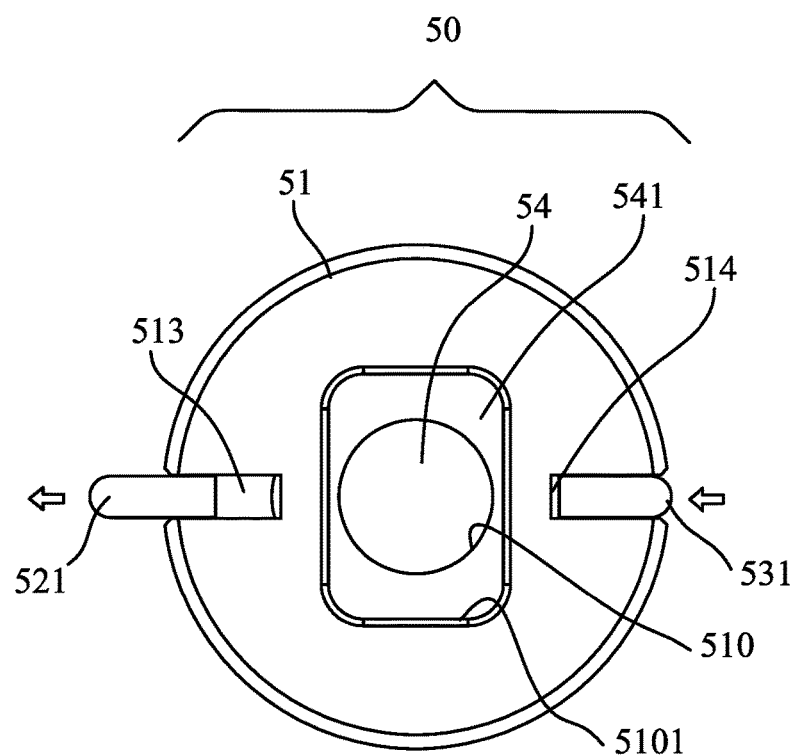
FIG. 7 is a cross-sectional view, taken in a radial direction, showing the rotary axle and the movable blades of the auxiliary dough driver according to the present invention.

As shown in FIGS. 3 and 5, the dough chamber 30 has sidewalls 31, 32 that are respectively adjacent to the auxiliary dough drivers 50, 50' and each shows a circular arc configuration, which, in the illustration of FIG. 5, is shown as a quarter circular arc as an example of illustration. Referring to FIGS. 5, 6, 7, and 9, when the helical screw shaft 21 and the auxiliary dough drivers 50, 50' located inside the dough chamber 30 are driven to rotate, the two auxiliary dough drivers 50, 50' are set in rotations in opposite directions at locations above the helical screw shaft 21 and, as shown in FIG. 5, when one of auxiliary dough drivers (such as that located at the right-hand side, which is the auxiliary dough driver 50 in the drawings) is rotated such that one of the movable blades, such as the movable blade 53, is rotated to pass the circular arc sidewall 31 of the dough chamber 30 and is thus compressed thereby, the driving plate 531 on that side or associated therewith (as shown in FIGS. 5 and 6) is forced to move into and thus received in the side slot 514 of the rotary axle 51. Further, as shown in FIGS. 6 and 9, the movable blade 53 so inwardly received drives the retention ring 532 to push the driving plate 521 of the movable blade 52 on the opposite side outward so as to force the driving plate 521 of the movable blade 52 to move outward and project beyond the circumferential wall of the rotary axle for contacting and driving the dough 91 contained in the dough chamber 30 to such a time point when the rotation of the rotary axle brings the movable blade 52 to reach the circular arc sidewall 31 of the dough chamber 30 to be received into the side slot 513 of the rotary axle 51 with a part of the dough 91 attached to the movable blade 52, 53 being removed therefrom during movement into the side slot. This operation is cyclically repeated to achieve effective and continuous moving and poking of the dough 91.

Although an arrangement comprising two auxiliary dough drivers 50, 50' as shown in FIGS. 3 and 5 is taken as an example for illustration of the present invention, in an actual application, the number involved may be varied, such as one or more than two, according to the size, design, and configuration of the dough chamber 30. Further, although an elongate plate is taken as an example for describing the driving plates 521, 531 of the movable blades 52, 53, in an actual application, for those having ordinary skills in the art, various modification of the shape or configuration may be feasible, and for example, an arc or curved shape, or other geometric shape, or even other configurations, may be used for of kinematic consideration.

As shown in FIGS. 1, 3, 4, and 5, in the present invention, the dough chamber 30 may be provided on a top thereof, with other accessories or devices, such as a feeding hopper 60 that is provided for carrying an increased amount of dough 91, or may alternatively connected to other dough processing machines to achieve an integrated process involving successively performed operations with various food processing machines.

In an actual embodiment of the present invention, the auxiliary dough drivers are provided with extendible/retractable driving plates such that an operation of kneading and poking dough in the dough chamber will not suffer any problems caused by dough attachment. Further, during the driving plate being forced inward, the driving plate, when passing the sidewall of the dough chamber, also functions to have dough attached scraped and removed so that cleaning after the operation is made easy. Further, the movable blades of the auxiliary dough driver are arranged at opposite sides and are operable such that when one is retracted inwardly, the other is forced outward to achieve an effective operation of driving and poking dough. Such a dough driver does not occupy a large amount of space, allowing for better utilization of space, and effectively prevents ineffective driving and poking of dough to thereby extend the life span of parts.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A dough preparation machine, comprising a power unit, which drives, via a rotational speed mechanism, a helical screw shaft, the helical screw shaft being arranged to extend into a dough chamber, a jet nozzle being arranged on an end of the dough chamber such that the dough is positionable into the dough chamber and driven and compressed through rotation of the helical screw shaft to be discharged through the jet nozzle, the dough chamber being provided with a bearing that is set at a location above the helical screw shaft, the bearing receiving and coupled to an auxiliary dough driver, which is driven by the power unit and the rotational speed mechanism, wherein the auxiliary dough driver comprises, at least, a rotary axle, the rotary axle comprising a shaft hole extending therethrough in an axial direction, the rotary axle being provided with at least one side opening that extends therethrough in a radial direction, the rotary axle being provided, in an outer circumference thereof, two side slots extending in a longitudinal direction and on two sides of the side opening;

two movable blades, which each comprise a driving plate in the form of an elongated plate and a retention ring, the two movable blades being respectively insertable into the rotary axle from two opposite sides thereof such that the retention rings are received in the side opening and the two driving plates are respectively received in the two side slots, a central shaft being received in and extending through the shaft hole of the rotary axle and also extending through the retention holes of the two movable blades, the central shaft being arranged to drive the rotary axle to rotate, a fastening assembly fixing the auxiliary dough driver to the bearing of the dough chamber; and the dough chamber comprises a sidewall at a location adjacent to the auxiliary dough driver and forms a circular arc, wherein when the auxiliary dough driver is in rotation, one of the movable blades that is moving to pass through the circular arc sidewall of the dough chamber is compressed inward thereby so as to have the driving plate thereof retracted inward and received in a corresponding one of the side slots of the rotary axle, and wherein the one of the movable blades, when retracted inward, drives another one of the movable blades outward through the retention rings so that the driving plate of said another one of the movable blades is caused to project out to drive and poke the dough until being further rotated to reach the circular arc sidewall of the dough chamber to be compressed inward thereby to thereby complete a cycle of extension-retraction based operation of dough kneading and poking.

2. The dough preparation machine according to claim 1, wherein the rotary axle of the auxiliary dough driver comprises a fitting slot formed at an end of the shaft hole in an expanded form with which a fitting section formed on the central shaft is engageable to allow the central shaft to drive the rotary axle.

3. The dough preparation machine according to claim 2, wherein the fitting slot and the fitting section that are engageable with each other are of non-circular shapes.

4. The dough preparation machine according to claim 1, wherein the at least one side opening that extends through the rotary axle comp in the radial direction comprises two side openings that are both formed in the side slots and the driving plates of the two movable blades are each provided with two retention rings, which are respectively inserted into the side openings of the rotary axle.

5. The dough preparation machine according to claim 1, wherein the retention rings of the two movable blades are inserted into the side opening that extends through the rotary axle in the radial direction are respectively set a frontward position and a rearward position that are adjacent tot and next to each other.

6. The dough preparation machine according to claim 1, wherein the retention rings of the two movable blades comprise an opening of an elongate elliptic form that is larger in size than a diameter of the central shaft so as to receive the central shaft to extend therethrough, wherein the two movable blades are allowed to move in the radial direction in a limited manner.

7. The dough preparation machine according to claim 1, wherein the circular arc sidewall of the dough chamber that is adjacent to the auxiliary dough driver is a quarter of a circle.

8. The dough preparation machine according to claim 1, wherein the dough chamber comprises two auxiliary dough drivers arranged therein and both located above the helical screw shaft and rotatable in opposite directions with respect to each other.

9. The dough preparation machine according to claim 1, wherein the driving plates of the movable blades are each one of an elongated plate, a curved plate, a plate of a geometric shape.

10. The dough preparation machine according to claim 1, wherein the dough chamber comprises more than two auxiliary dough drivers arranged therein.

* * * * *